United States Patent
Li et al.

(10) Patent No.: US 11,386,690 B2
(45) Date of Patent: Jul. 12, 2022

(54) FINGERPRINT IDENTIFICATION MODULE AND DRIVING METHOD THEREFOR, AND DISPLAY APPARATUS

(71) Applicant: BOE Technology Group Co., Ltd., Beijing (CN)

(72) Inventors: Xiufeng Li, Beijing (CN); Yingming Liu, Beijing (CN); Haisheng Wang, Beijing (CN); Xue Dong, Beijing (CN); Yuzhen Guo, Beijing (CN); Lijun Zhao, Beijing (CN); Chenyang Zhang, Beijing (CN); Yaqian Ji, Beijing (CN); Yanling Han, Beijing (CN); Peixiao Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/280,374

(22) PCT Filed: Aug. 21, 2020

(86) PCT No.: PCT/CN2020/110459
§ 371 (c)(1),
(2) Date: Mar. 26, 2021

(87) PCT Pub. No.: WO2021/032185
PCT Pub. Date: Feb. 25, 2021

(65) Prior Publication Data
US 2022/0036027 A1    Feb. 3, 2022

(30) Foreign Application Priority Data
Aug. 22, 2019  (CN) .......................... 201910780757.X (51) Int. Cl.
G06V 40/13      (2022.01)
G06V 10/147     (2022.01)

(52) U.S. Cl.
CPC ........ G06V 40/1306 (2022.01); G06V 10/147 (2022.01)

(58) Field of Classification Search
None
See application file for complete search history.

(56) References Cited

U.S. PATENT DOCUMENTS

2017/0372114 A1   12/2017   Cho et al.
2020/0097699 A1*   3/2020   Zeng .................. H01L 51/5281
(Continued)

FOREIGN PATENT DOCUMENTS

| CN | 108133193 A | 6/2018 |
| CN | 108564015 A | 9/2018 |
| CN | 210324247 U | 4/2020 |

Primary Examiner — Nicholas J Lee
(74) Attorney, Agent, or Firm — Banner & Witcoff, Ltd.

(57) ABSTRACT

A fingerprint identification module and a driving method therefor, and a display apparatus. The fingerprint identification module includes a base substrate and a plurality of fingerprint identification regions located on the base substrate, each fingerprint identification region includes a plurality of receiving electrodes, a piezoelectric material layer and a plurality of driving electrodes; and the plurality of receiving electrodes, the piezoelectric material layer and the plurality of driving electrodes form a plurality of ultrasonic sensors. Each fingerprint identification region is correspondingly provided with at least one driving chip, the plurality of driving electrodes in each fingerprint identification region is connected to an output terminal of the at least one driving chip; and the at least one driving chip is configured to apply a driving voltage to the plurality of driving electrodes to driving the plurality of ultrasonic sensors in the corresponding fingerprint identification region to perform fingerprint identification.

20 Claims, 7 Drawing Sheets (56) References Cited

U.S. PATENT DOCUMENTS

2020/0265208 A1\* 8/2020 Wang .................. G06V 10/141
2021/0019497 A1   1/2021 Zhu \* cited by examiner

FINGERPRINT IDENTIFICATION MODULE AND DRIVING METHOD THEREFOR, AND DISPLAY APPARATUS

The application is a U.S. National Phase Entry of International Application No. PCT/CN2020/110459 filed on Aug. 21, 2020, designating the United States of America and claiming priority to Chinese Patent Application No. 201910780757.X filed on Aug. 22, 2019. The present application claims priority to and the benefit of the above-identified applications and the above-identified applications are incorporated by reference herein in their entirety.

TECHNICAL FIELD

Embodiments of the present disclosure relate to fingerprint identification module, a driving method thereof and a display apparatus.

BACKGROUND

With the continuous development of science and technology, fingerprint identification technology has been gradually applied to people's daily life. Fingerprint identification technology can identify different fingerprints by comparing their detailed feature points, so as to achieve the function of personal identification. Generally, fingerprint identification technology can be divided into optical fingerprint identification technology, silicon chip fingerprint identification technology and ultrasonic fingerprint identification technology.

At present, ultrasonic fingerprint identification technology is a hot research direction of major manufacturers. An ultrasonic fingerprint identification structure is mainly a three-layer structure, which includes a driving electrode, a receiving electrode, and a piezoelectric material layer between them. When a driving voltage is applied to the driving electrode and the receiving electrode, the piezoelectric layer is excited by the voltage to generate inverse piezoelectric effect and generate regular vibration, thereby emitting a first ultrasonic wave outward. The first ultrasonic wave contacts a finger and a second ultrasonic wave is reflected back by the finger. Because the fingerprint includes valleys and ridges, the vibration intensities of the second ultrasonic waves reflected by the fingerprint back to the piezoelectric layer are different. At this time, when a fixed voltage is applied to the driving electrode, the piezoelectric layer can convert the second ultrasonic wave into a voltage signal, the voltage signal is transmitted to a fingerprint identification module through the receiving electrode. The positions of valleys and ridges in the fingerprint are judged according to the voltage signal, and a fingerprint image is obtained after processing.

SUMMARY

Embodiments of the present disclosure provide a fingerprint identification module, a driving method thereof, and a display apparatus. By the means of arranging a plurality of fingerprint identification regions, and providing at least one driving chip in each fingerprint identification region, a single driving chip only needs to drive a fingerprint identification region with a small area, thus the fingerprint identification module can realize large-area fingerprint detection. In addition, a single driving chip only needs to drive a fingerprint identification region with a small area, so the driving chip can adopt a mono-crystal semiconductor-based chip such as a silicon-based chip or a gallium arsenide-based chip, etc., thereby providing a high-performance driving voltage and improving the performance of fingerprint identification.

At least one embodiment of the present disclosure provides a fingerprint identification module, which includes a base substrate and a plurality of fingerprint identification regions located on the base substrate, wherein each of the plurality of fingerprint identification regions includes: a plurality of receiving electrodes; a piezoelectric material layer, located at a side of the plurality of receiving electrodes; and a plurality of driving electrodes, located at a side of the piezoelectric material layer away from the plurality of receiving electrodes; wherein the plurality of receiving electrodes, the piezoelectric material layer and the plurality of driving electrodes form a plurality of ultrasonic sensors, each of the plurality of fingerprint identification regions is correspondingly provided with at least one driving chip, the plurality of driving electrodes in each of the plurality of fingerprint identification regions are connected with an output terminal of the at least one driving chip, and the at least one driving chip is configured to apply a driving voltage to the plurality of driving electrodes so as to drive the plurality of ultrasonic sensors in the corresponding fingerprint identification region to perform fingerprint identification.

For example, the fingerprint identification module provided by an embodiment of the present disclosure further includes interconnection lines, connecting the plurality of driving electrodes in each of the plurality of fingerprint identification regions with a plurality of output terminals of the at least one driving chip.

For example, the fingerprint identification module provided by an embodiment of the present disclosure further includes a flexible circuit board; and an external integrated circuit, wherein a control terminal of the at least one driving chip corresponding to each of the plurality of fingerprint identification regions is connected with the external integrated circuit through the flexible circuit board.

For example, the fingerprint identification module provided by an embodiment of the present disclosure further includes an encapsulation layer, located at a side of the plurality of ultrasonic sensors and the at least one driving chip away from the base substrate, and covering the plurality of ultrasonic sensors and the at least one driving chip to encapsulate the plurality of ultrasonic sensors and the at least one driving chip on the base substrate, wherein the at least one driving chip includes a mono-crystal semiconductor substrate and a driving circuit, and a part of the driving circuit is located in the mono-crystal semiconductor substrate.

For example, in the fingerprint identification module provided by an embodiment of the present disclosure, the plurality of receiving electrodes are arranged in an array along a first direction and a second direction, each of the plurality of driving electrodes is a strip-shaped driving electrode extending along the first direction, and a plurality of the strip-shaped driving electrodes are arranged at intervals along the second direction.

For example, in the fingerprint identification module provided by an embodiment of the present disclosure, each of the plurality of fingerprint identification regions is correspondingly provided with one driving chip, each of the plurality of fingerprint identification regions includes a plurality of focusing units, each of the plurality of focusing units includes N strip-shaped driving electrodes arranged in sequence along the second direction, and the strip-shaped driving electrodes with a same order in the plurality of focusing units are electrically connected with one another and connected with one output terminal of the driving chip, where N is a positive integer greater than or equal to 2.

For example, in the fingerprint identification module provided by an embodiment of the present disclosure, the plurality of fingerprint identification regions are arranged at intervals along the first direction and have a first gap between two adjacent ones of the plurality of fingerprint identification regions, an orthographic projection of the driving chip on the base substrate is spaced apart from the plurality of fingerprint identification regions and the first gap, and a width of the first gap in the first direction is less than one third of a width of each of the plurality of fingerprint identification regions in the first direction.

For example, in the fingerprint identification module provided by an embodiment of the present disclosure, each of the plurality of fingerprint identification regions is correspondingly provided with a plurality of driving chips, each of the plurality of fingerprint identification regions includes one focusing unit, the focusing unit includes M strip-shaped driving electrodes arranged in sequence along the second direction, and the M strip-shaped driving electrodes are respectively connected with M output terminals of the plurality of driving chips, where M is a positive integer greater than or equal to 2.

For example, in the fingerprint identification module provided by an embodiment of the present disclosure, the plurality of fingerprint identification regions are arranged at intervals along the first direction and have a second gap between two adjacent ones of the plurality of fingerprint identification regions, the plurality of driving chips are sequentially arranged along the second direction, and the plurality of driving chips are arranged at a side of a corresponding one of the plurality of fingerprint identification regions in the first direction, and a width of the second gap in the first direction is less than one half of a width of each of the plurality of fingerprint identification regions in the first direction.

For example, in the fingerprint identification module provided by an embodiment of the present disclosure, the plurality of fingerprint identification regions are arranged at intervals along the first direction and have a third gap between two adjacent ones of the plurality of fingerprint identification regions, a width of the third gap is less than twice a width of the strip-shaped driving electrode, an orthographic projection of the at least one driving chip on the base substrate is at least partially overlapped with an orthographic projection of the plurality of ultrasonic sensors on the base substrate; and the at least one driving chip is located at a side of the plurality of ultrasonic sensors away from the base substrate.

For example, in the fingerprint identification module provided by an embodiment of the present disclosure, each of the plurality of fingerprint identification regions is correspondingly provided with one driving chip, each of the plurality of fingerprint identification regions includes one focusing unit, the focusing unit includes K strip-shaped driving electrodes arranged in sequence along the second direction, and the K strip-shaped driving electrodes are connected with K output terminals of the driving chip, and the driving chip is arranged at a side of the corresponding fingerprint identification region in the first direction, where K is a positive integer greater than or equal to 2.

For example, in the fingerprint identification module provided by an embodiment of the present disclosure, the plurality of fingerprint identification regions are arranged in an array along the first direction and the second direction.

For example, in the fingerprint identification module provided by an embodiment of the present disclosure, there is a gap between an orthographic projection of the at least one driving chip on the base substrate and an orthographic projection of the piezoelectric material layer on the base substrate.

For example, in the fingerprint identification module provided by an embodiment of the present disclosure, an orthographic projection of the at least one driving chip on the base substrate is at least partially overlapped with the orthographic projection of the plurality of ultrasonic sensors on the base substrate, and the at least one driving chip is located at a side of the plurality of ultrasonic sensors away from the base substrate.

For example, in the fingerprint identification module provided by an embodiment of the present disclosure, the plurality of receiving electrodes are arranged in an array along a first direction and a second direction, and each of the plurality of driving electrodes is a block-shaped driving electrode arranged in an array along the first direction and the second direction, and the plurality of receiving electrodes are arranged in one-to-one correspondence with the plurality of block-shaped driving electrodes.

For example, in the fingerprint identification module provided by an embodiment of the present disclosure, each of the plurality of fingerprint identification regions is correspondingly provided with one driving chip, each of the plurality of fingerprint identification regions includes at least one focusing unit, each focusing unit includes D*D block-shaped driving electrodes arranged in a D*D matrix along the first direction and the second direction, and the D*D block-shaped driving electrodes are connected with the driving chip, where D is a positive integer greater than or equal to 2.

For example, in the fingerprint identification module provided by an embodiment of the present disclosure, each of the plurality of fingerprint identification regions includes a plurality of focusing units, and the block-shaped driving electrodes with same coordinates in the plurality of focusing units are electrically connected with one another and connected with one output terminal of the driving chip.

For example, in the fingerprint identification module provided by an embodiment of the present disclosure, the base substrate includes a glass substrate.

At least one embodiment of the present disclosure further provides a display apparatus, including any one of the abovementioned fingerprint identification modules.

For example, the display apparatus provided by an embodiment of the present disclosure further includes a display panel, having a light emitting side; and an adhesive layer, wherein the fingerprint identification module is attached to one side of the display panel away from the light emitting side through the adhesive layer, and the adhesive layer includes a light shielding layer.

At least one embodiment of the present disclosure further provides a driving method of a fingerprint identification module, wherein the fingerprint identification module is any one of the abovementioned fingerprint identification modules, and the driving method includes: obtaining a fingerprint identification region corresponding to a finger touch position; applying a control signal to the at least one driving chip in the fingerprint identification region corresponding to the finger touch position; and applying a driving voltage to the plurality of driving electrodes under control of the control signal by using the at least one driving chip so as to drive the corresponding fingerprint identification region to perform fingerprint identification.

For example, in the driving method provided by an embodiment of the present disclosure, applying the driving voltage to the plurality of driving electrodes under the control of the control signal by using the at least one driving chip so as to drive the corresponding fingerprint identification region to perform fingerprint identification includes: applying driving voltages with different phases to the plurality of driving electrodes under the control of the control signal by using the at least one driving chip so as to focus in the fingerprint identification region

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

Among all of the fingerprint identification technologies, ultrasonic fingerprint identification technology has obvious advantages such as strong penetration capability, anti-pollution, anti-interference and anti-deception, etc., and has been increasingly used in the identity authentication of mobile devices such as smart phones. Moreover, ultrasonic fingerprint identification technology can also provide a hidden fingerprint solution for the full screen design of mobile devices such as smart phones.

In research, the inventors of the present application has observed that when the ultrasonic fingerprint sensor is disposed in a display apparatus such as a smart phone, the distance between the piezoelectric material layer of the ultrasonic sensor and the finger is often large (500-2000 microns) because the ultrasonic fingerprint sensor needs to be disposed under the display panel. However, ultrasonic waves are divergent and diffractive during transmission, so that crosstalk of ultrasonic waves reflected by adjacent valleys and ridges on the finger may be caused, which will reduce signal resolution and image contrast, and further affect the performance and accuracy of fingerprint identification. In this regard, on the one hand, the intensity of ultrasonic wave can be improved by increasing the driving voltage of the ultrasonic sensor, and on the other hand, the crosstalk can be reduced by focusing the ultrasonic wave, so that the fingerprint image quality can be significantly improved.

However, the above two methods require a driving circuit that can generate a driving voltage with high frequency, high voltage and different phases. Glass-based thin film transistor (TFT) circuits have the advantages of low cost and easy fabrication in large area, but it is difficult for glass-based thin film transistor circuits to generate high-performance (for example, the frequency is greater than 1 MHz) driving voltages, while silicon-based thin film transistor circuits can realize high-performance driving voltages, but they are small in size, high in cost and difficult to realize fingerprint detection in large area.

The embodiments of the disclosure provide a fingerprint identification module, a driving method thereof and a display apparatus. The fingerprint identification module includes a base substrate and a plurality of fingerprint identification regions located on the base substrate; and each of the plurality of fingerprint identification regions includes a plurality of receiving electrodes, a piezoelectric material layer and a plurality of driving electrodes. The plurality of receiving electrodes are located on the base substrate, the piezoelectric material layer is located at a side of the plurality of receiving electrodes away from the base substrate, and the plurality of driving electrodes are located at a side of the piezoelectric material layer away from the plurality of receiving electrodes; and the plurality of receiving electrodes, the piezoelectric material layers and the plurality of driving electrodes form a plurality of ultrasonic sensors. each of the plurality of fingerprint identification regions is correspondingly provided with at least one driving chip, the plurality of driving electrodes in each of the plurality of fingerprint identification regions are connected with an output terminal of the at least one driving chip, and the at least one driving chip is configured to apply a driving voltage to the plurality of driving electrodes so as to drive the plurality of ultrasonic sensors in the corresponding fingerprint identification region to perform fingerprint identification. Therefore, the fingerprint identification module is provided with a plurality of fingerprint identification regions, and each fingerprint identification region is provided with at least one driving chip, so that a single driving chip only needs to drive a fingerprint identification region with a small area, thereby realizing large-area fingerprint detection. In addition, a single driving chip only needs to drive a fingerprint identification region with a small area, so the driving chip can adopt a mono-crystal semiconductor-based chip such as a silicon-based chip or a gallium arsenide-based chip, etc., thereby providing a high-performance driving voltage and improving the performance of fingerprint identification.

Hereinafter, the fingerprint identification module, the driving method thereof and the display apparatus provided by the embodiments of the present disclosure will be described in detail with reference to the accompanying drawings.

Figure 1:
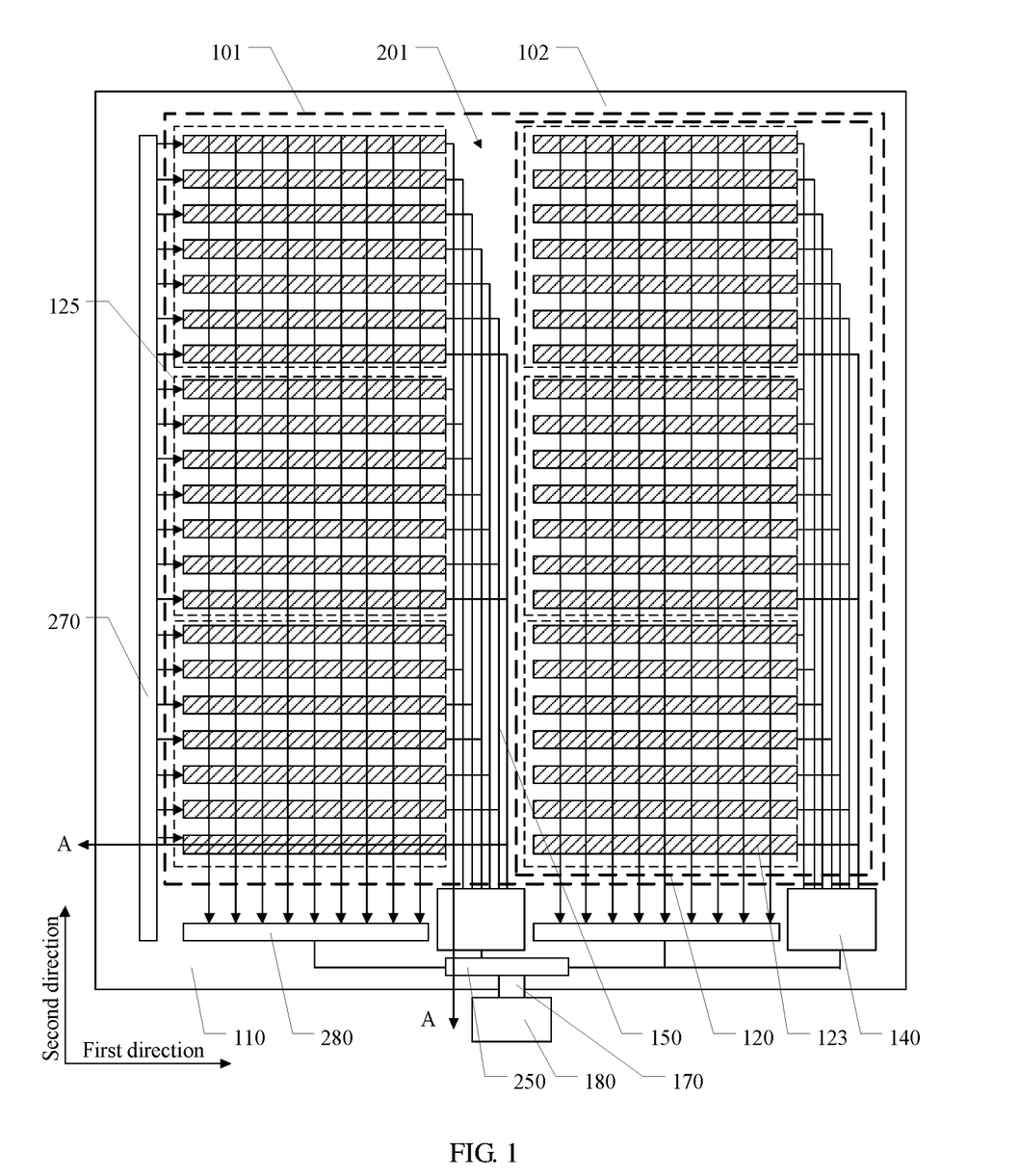
FIG. 1 is a schematic plan view of a fingerprint identification module according to an embodiment of the present disclosure.
Figure 2:
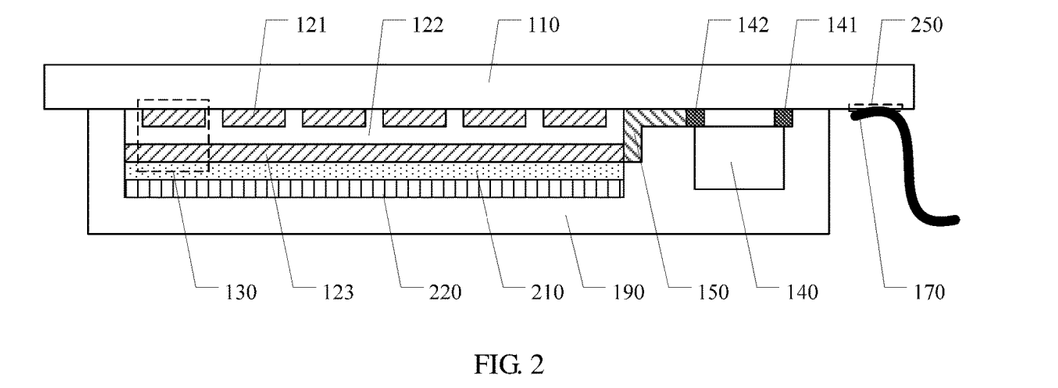
FIG. 2 is a schematic cross-sectional view of a fingerprint identification module according to an embodiment of the present disclosure along AA direction in FIG. 1.

FIG. 1 is a schematic plan view of a fingerprint identification module according to an embodiment of the present disclosure. FIG. 2 is a schematic cross-sectional view of a fingerprint identification module according to an embodiment of the present disclosure along AA direction in FIG. 1. As shown in FIGS. 1-2, the fingerprint identification module 100 includes a base substrate 110 and a plurality of fingerprint identification regions 120 located on the base substrate 110. For example, FIG. 1 shows two fingerprint identification regions 120 arranged at intervals along the first direction, but the number of fingerprint identification regions in the fingerprint identification module provided by the embodiment of the present disclosure is not limited to two, but may be more. As shown in FIGS. 1-2, each fingerprint identification region 120 includes a plurality of receiving electrodes 121, a piezoelectric material layer 122 and a plurality of driving electrodes 123; the plurality of receiving electrodes 121 are located on the base substrate 110, the piezoelectric material layer 122 is located at a side of the plurality of receiving electrodes 121 away from the base substrate 110, and the plurality of driving electrodes 123 are located at a side of the piezoelectric material layer 122 away from the plurality of receiving electrodes 121, so that the plurality of receiving electrodes 121, the piezoelectric material layer 122 and the plurality of driving electrodes 123 can form a plurality of ultrasonic sensors 130. As shown in FIGS. 1-2, each fingerprint identification region 120 is correspondingly provided with at least one driving chip 140, and the plurality of driving electrodes 123 in each fingerprint identification region 120 are connected with an output terminal 142 of the at least one driving chip 140, and the at least one driving chip 140 is configured to apply a driving voltage to the plurality of driving electrodes 123 to drive the plurality of ultrasonic sensors 130 in the corresponding fingerprint identification region 120 to perform fingerprint identification. For example, the driving chip 140 can apply the driving voltage to the plurality of driving electrodes 123, so that the corresponding ultrasonic sensors 130 emit ultrasonic waves; the ultrasonic waves are reflected back to the piezoelectric material layer 122 by valleys and ridges of the finger, converted into electrical signals, and received by the plurality of receiving electrodes 121, so that fingerprint identification can be performed.

In the fingerprint identification module provided by the embodiment of the present disclosure, a plurality of fingerprint identification regions are arranged, and each of the fingerprint identification regions is provided with at least one driving chip, so that a single driving chip only needs to drive a fingerprint identification region with a small area, thereby realizing large-area fingerprint detection. In addition, a single driving chip only needs to drive a fingerprint identification region with a small area, so the driving chip can adopt a mono-crystal semiconductor-based chip such as a silicon-based chip or a gallium arsenide-based chip, etc., to provide a high-performance driving voltage, and a single driving chip can also independently control the driving voltages of each ultrasonic sensor (for example, provide driving voltages with different phases), thereby realizing functions such as ultrasonic focusing, etc. Therefore, on the one hand, the fingerprint identification module can improve the intensity and penetration capability of ultrasonic waves emitted by the ultrasonic sensor, and on the other hand, the fingerprint identification module can realize ultrasonic focusing to improve the directionality of ultrasonic waves and reduce the crosstalk between ultrasonic waves reflected by adjacent valleys and ridges on the finger, thus significantly improving the fingerprint image quality and further improving the fingerprint identification performance. In addition, on the other hand, when the fingerprint identification module improves the intensity or energy of the emitted ultrasonic waves in a specific region or direction by focusing the ultrasonic waves, the fingerprint identification module can not only realize fingerprint identification, but also penetrate the finger to distinguish whether the fingerprint is real skin.

It should be noted that, as shown in FIGS. 1-2, the plurality of driving electrodes 123 in each fingerprint identification region 120 are respectively connected with a plurality of output terminals 142 of the at least one driving chip 140, that is, the at least one driving chip 140 has a plurality of output terminals 142, and the plurality of driving electrodes 123 in each fingerprint identification region 120 are connected with different output terminals 142, so that they can be driven by different driving voltages (e.g., driving voltages with different phases), and further realize the functions such as ultrasonic focusing, etc.

In some examples, as shown in FIGS. 1-2, the fingerprint identification module 100 further includes interconnection lines 150, which connect the plurality of driving electrodes 123 in each fingerprint identification region 120 with the plurality of output terminals 142 of the at least one driving chip 140, so that the plurality of driving electrodes 123 in each fingerprint identification region 120 can be driven by different driving voltages (e.g., driving voltages with different phases), thereby realizing the functions such as ultrasonic focusing, etc.

In some examples, as shown in FIG. 2, the fingerprint identification module 100 further includes a flexible circuit board 170 and an external integrated circuit 180; a control terminal 142 of the at least one driving chip 140 corresponding to each fingerprint identification region 120 is connected with the external integrated circuit 180 through the flexible circuit board 170. Therefore, the external integrated circuit 180 can control whether the driving chip 140 transmits the driving voltage and the parameters such as voltage, frequency and phase of the transmitted driving voltage. Furthermore, the external integrated circuit 180 can also control a plurality of driving chips 140 corresponding to a plurality of fingerprint identification regions 120 at the same time to realize large-area fingerprint identification.

In some examples, as shown in FIG. 2, the fingerprint identification module 100 further includes a bonding region 250, and the input terminals 141 of the plurality of driving chips 140 corresponding to the plurality of fingerprint identification regions 120 are connected to the bonding region 250, and one end of the flexible circuit board 170 is connected to the bonding region 250 and the other end of the flexible circuit board 170 is connected to the external integrated circuit 180.

For example, the external integrated circuit 180 described above can be a CPU, such as a CPU mounted on a smart phone or a CPU specially used for fingerprint identification.

In some examples, as shown in FIG. 2, the fingerprint identification module 100 further includes an encapsulation layer 190; the encapsulation layer 190 is located at a side of the plurality of ultrasonic sensors 130 and the at least one driving chip 140 away from the base substrate 110, and covers the plurality of ultrasonic sensors 130 and the at least one driving chip 140 to encapsulate the plurality of ultrasonic sensors 130 and the at least one driving chip 140 on the base substrate 110. The driving chip 140 includes a mono-crystal semiconductor substrate 141 and a driving circuit 142, a part of the driving circuit 142 is located in the mono-crystal semiconductor substrate 141. Because the driving chip 140 is based on the mono-crystal semiconductor substrate 141, a driving voltage with high performance (for example, high voltage and high frequency) can be provided. Moreover, the fingerprint identification module 100 can integrate the driving chip 140 based on the mono-crystal semiconductor substrate 141 on the base substrate 110. It should be noted that the encapsulation layer 190 can encapsulate a single fingerprint identification region 120 or all fingerprint identification regions 120 of the fingerprint identification module 100, that is, the encapsulation layer 190 covers the ultrasonic sensors 130 and the driving chips 140 in all fingerprint identification regions 120 of the fingerprint identification module 100.

In some examples, the mono-crystal semiconductor substrate 141 described above includes at least one of a mono-crystal silicon substrate and a mono-crystal gallium arsenide substrate.

In some examples, the size of the driving chip 140 is less than 3 mm; in the case where the planar shape of the driving chip 140 is rectangular, the length and width of the driving chip 140 are both less than 3 mm, so as to ensure a good fingerprint detection effect.

For example, the frequency of the driving voltage output by the output terminal 142 of the driving chip 140 is greater than 5 MHz, and for example, the frequency range of the driving voltage output by the output terminal 142 of the driving chip 140 can be 5-30 MHz. In addition, the absolute value of the driving voltage output by the output terminal 142 of the driving chip 140 is greater than 30 V, for example, the absolute value range of the driving voltage output by the output terminal 142 of the driving chip 140 can be 30-100 V. Therefore, the ultrasonic sensor can have a good performance (e.g., relatively large energy and intensity).

In some examples, the base substrate 110 described above includes a glass substrate. Therefore, with respect to the fingerprint identification module 100, the ultrasonic sensors 130 can be manufactured on the base substrate 110 by glass-based manufacturing equipment and process, so that a fingerprint identification module with a relatively large size can be manufactured at a relatively low cost. At the same time, with respect to the fingerprint identification module 100, the driving chip 140 having the mono-crystal semiconductor substrate with high performance is also integrated on the base substrate 110, thus giving consideration to large size, low cost and high-performance fingerprint identification. Of course, the embodiments of the present disclosure include but are not limited to this case, and the base substrate can also be made of other materials, and for example, the base substrate can be a polyimide substrate.

In some examples, as shown in FIG. 1, the fingerprint identification module 100 further includes a row control circuit 270 and a reading circuit 280, and the row control circuit 270 and the reading circuit 280 are configured to read the electrical signals on a plurality of receiving electrodes 121 to obtain fingerprint image information. It should be noted that the row control circuit 270 and the reading circuit 280 mentioned above can be manufactured on the base substrate by using the same equipment and process (i.e., glass-based manufacturing equipment and process) as the ultrasonic sensors 130, thereby further saving the cost. The embodiments of the present disclosure do not limit the specific structures of the row control circuit and the read circuit.

In some examples, as shown in FIGS. 1-2, the plurality of receiving electrodes 121 are arranged in an array along a first direction and a second direction, and each driving electrode 123 is a strip-shaped driving electrode 123 extending along the first direction, and a plurality of strip-shaped driving electrodes 123 are arranged at intervals along the second direction. Therefore, in the case where the plurality of strip-shaped driving electrodes 123 arranged at intervals along the second direction are driven independently, focusing in the second direction can be realized.

Figure 3A:
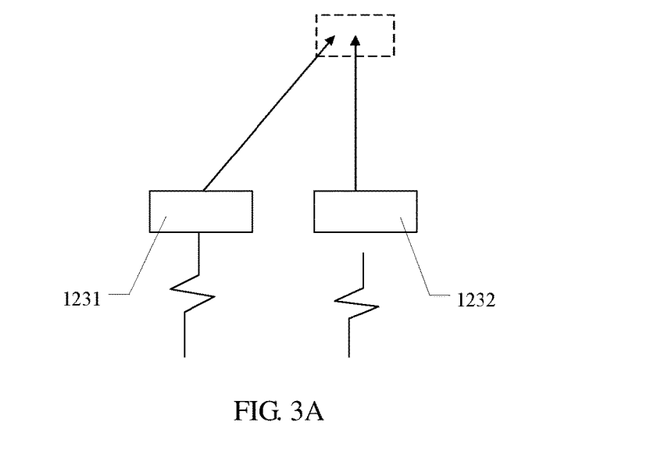
FIG. 3A is a schematic diagram of realizing ultrasonic focusing by a fingerprint identification module according to an embodiment of the present disclosure.

FIG. 3A is a schematic diagram of realizing ultrasonic focusing by a fingerprint identification module according to an embodiment of the present disclosure. As shown in FIG. 3A, the plurality of strip-shaped driving electrodes 123 include a first strip-shaped driving electrode 1231 and a second strip-shaped driving electrode 1232 sequentially arranged along the second direction. In this case, a driving voltage is applied to the first strip-shaped driving electrode 1231 at a first time point to drive the piezoelectric material layer corresponding to the first strip-shaped driving electrode 1231 to emit an ultrasonic wave, and then a driving voltage is applied to the second strip-shaped driving electrode 1232 at a second time point to drive the piezoelectric material layer corresponding to the second strip-shaped driving electrode 1232 to emit an ultrasonic wave with a phase delayed compared with the phase of the ultrasonic wave emitted by the first strip-shaped driving electrode 1231, and therefore, focusing (additive interference) of the ultrasonic waves can be realized directly above the second strip-shaped driving electrode 1232 (or in other direction of the second strip-shaped driving electrode 1232 away from the first driving electrode 1231), so that the intensity or energy of ultrasonic waves directly above the second strip-shaped driving electrode 1232 can be enhanced. It should be noted that the second time point is delayed from the first time point. It should be noted that the retardation between the phase of the ultrasonic wave emitted by the piezoelectric material layer corresponding to the second strip-shaped driving electrode and the phase of the ultrasonic wave emitted by the piezoelectric material layer corresponding to the first strip-shaped driving electrode can be obtained by testing according to the actual situations.

Figure 3B:
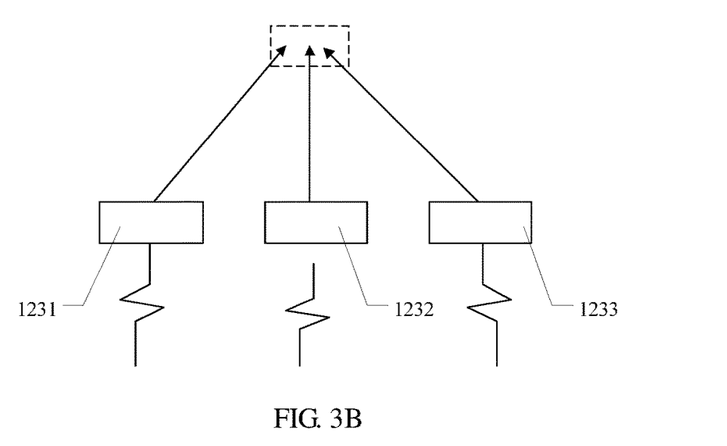
FIG. 3B is a schematic diagram of realizing ultrasonic focusing by another fingerprint identification module according to an embodiment of the present disclosure.

FIG. 3B is a schematic diagram of realizing ultrasonic focusing by another fingerprint identification module according to an embodiment of the present disclosure. As shown in FIG. 3B, the plurality of strip-shaped driving electrodes 123 include a first strip-shaped driving electrode 1231, a second strip-shaped driving electrode 1232 and a third strip-shaped driving electrode 1233 sequentially arranged along the second direction. In this case, a driving voltage is applied to the first strip-shaped driving electrode 1231 and the third strip-shaped driving electrode 1233 at a first time point to drive the piezoelectric material layers corresponding to the first strip-shaped driving electrode 1231 and the third strip-shaped driving electrode 1233 to emit ultrasonic waves, and a driving voltage is applied to the second strip-shaped driving electrode 1232 at a second time point to drive the piezoelectric material layer corresponding to the second strip-shaped driving electrode 1232 to emit an ultrasonic wave with a phase delayed compared with the phase of the ultrasonic waves emitted by the first strip-shaped driving electrode 1231 and the third strip-shaped driving electrode 1233, and therefore, focusing (additive interference) of the ultrasonic waves can be realized directly above the second strip-shaped driving electrode 1232, that is, the intensity or energy of ultrasonic waves directly above the second strip-shaped driving electrode 1222 is enhanced.

It should be noted that FIGS. 3A-3B show cases where two or three strip-shaped driving electrodes are respectively driven to realize ultrasonic focusing; however, embodiments of the present disclosure include but are not limited to these cases, and the fingerprint identification module can realize ultrasonic focusing by driving more strip-shaped driving electrodes respectively.

For example, the distance between the central lines of two adjacent strip-shaped driving electrodes 123 can be in the range of 40-60 microns, for example, can be 50 microns.

In some examples, as shown in FIGS. 1-2, there is a gap between the orthographic projection of the at least one driving chip 140 on the base substrate 110 and the orthographic projection of the plurality of ultrasonic sensors 130 on the base substrate 110. That is, the orthographic projection of the at least one driving chip 140 on the base substrate 110 is not overlapped with the orthographic projection of the plurality of ultrasonic sensors 130 on the base substrate 110, and the driving chip 140 and the ultrasonic sensors 130 are disposed on the base substrate 110. It should be noted that the driving chip 140 can be directly fixed on the base substrate 110 by transferring or soldering.

In some examples, as shown in FIG. 1, each fingerprint identification region 120 is correspondingly provided with one driving chip 140, and each fingerprint identification region 120 includes a plurality of focusing units 125, each focusing unit 125 includes N strip-shaped driving electrodes 123 arranged in sequence along the second direction, and the strip-shaped driving electrodes 123 with the same order in the plurality of focusing units 125 are electrically connected with one another and connected with one output terminal 142 of the driving chip 140, where N is a positive integer greater than or equal to 2. Therefore, the fingerprint identification module can simultaneously drive the plurality of focusing units 125 via one driving chip 140, so that the number of driving chips 140 can be reduced, and the plurality of focusing units 125 can simultaneously perform focusing and fingerprint identification, thereby improving the efficiency of fingerprint identification.

For example, each fingerprint identification region 120 includes three focusing units 125, each focusing unit 125 includes seven strip-shaped driving electrodes arranged in sequence along the second direction, the three strip-shaped driving electrodes 123 with a first order in the three focusing units 125 can be electrically connected with one another and connected with one output terminal 142 of the driving chip 140, and the three strip-shaped driving electrodes 123 with a second order in the three focusing units 125 can be electrically connected with one another and connected with one output terminal 140 of the driving chip 140, and so on. It should be noted that the strip-shaped driving electrodes 123 with different orders in the plurality of focusing units 125 are connected with different output terminals 142.

In some examples, as shown in FIG. 1, the plurality of fingerprint identification regions 120 are arranged at intervals along the first direction and have a first gap 201 between two adjacent ones of the plurality of fingerprint identification regions 120, the orthographic projection of the driving chip 140 on the base substrate 110 is spaced apart from the plurality of fingerprint identification regions 120 and the first gap 201, and the width of the first gap 201 in the first direction is less than one third of the width of the fingerprint identification region 120 in the first direction. Because the driving chip 140 is not arranged in the fingerprint identification regions 120 and the first gap 201, the driving chip 140 can be arranged in the peripheral region 102 around the touch region 101 of the fingerprint identification module 100, and the width of the first gap 201 in the first direction is less than one third of the width of the fingerprint identification region 120 in the first direction, thereby increasing the proportion of the fingerprint identification regions in the touch region and greatly reducing the detection blind region.

Figure 4:
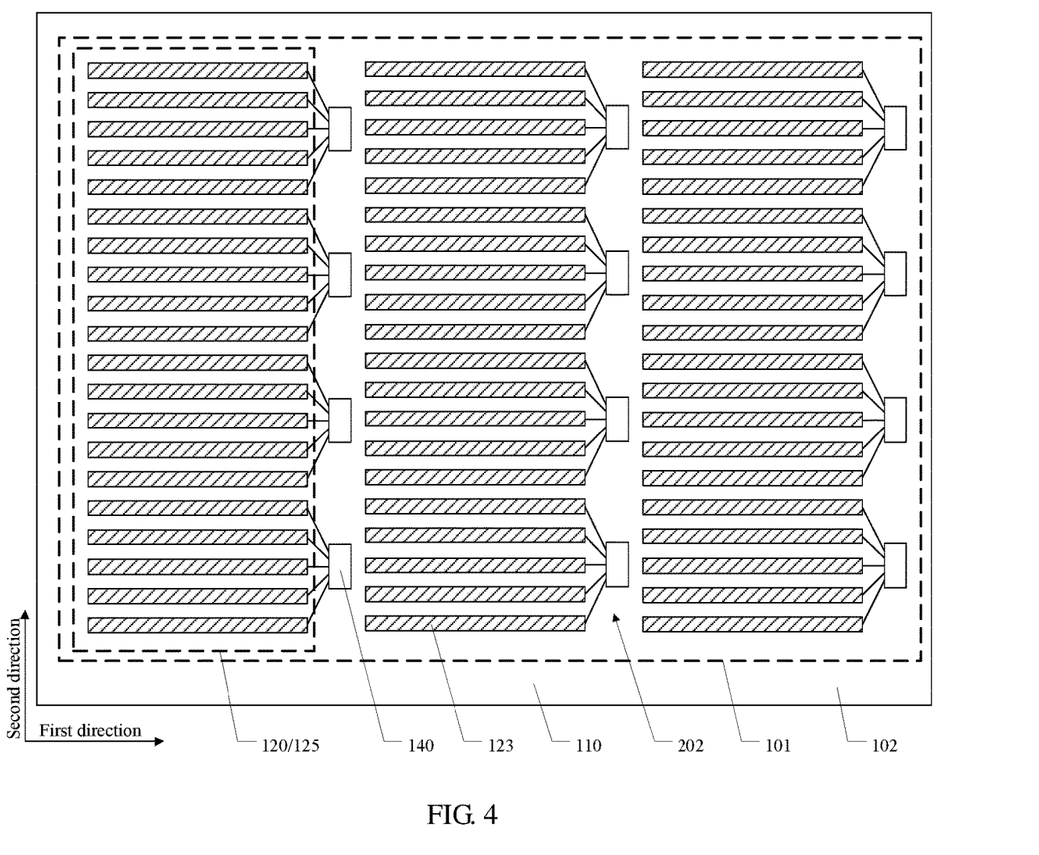
FIG. 4 is a schematic plan view of another fingerprint identification module according to an embodiment of the present disclosure.

FIG. 4 is a schematic plan view of another fingerprint identification module according to an embodiment of the present disclosure. As shown in FIG. 4, each fingerprint identification region 120 is correspondingly provided with a plurality of driving chips 140, each fingerprint identification region 120 includes one focusing unit 125, the focusing unit 125 includes M strip-shaped driving electrodes 123 arranged in sequence along the second direction, and the M strip-shaped driving electrodes 123 are respectively connected with M output terminals of the plurality of driving chips 140, where M is a positive integer greater than or equal to 2. That is, the plurality of driving chips 140 have a total of M output terminals 142, and the M strip-shaped driving electrodes 123 of the focusing unit 125 are connected with the M output terminals 142 of the plurality of driving chips 140. Therefore, the fingerprint identification module can drive one focusing unit 125 via the plurality of driving chips 140.

In some examples, as shown in FIG. 4, the plurality of fingerprint identification regions 120 are arranged at intervals along the first direction and have a second gap 202 between two adjacent ones of the plurality of fingerprint identification regions 120, the plurality of driving chips 140 are sequentially arranged along the second direction, and the plurality of driving chips 140 are arranged at a side of the corresponding fingerprint identification regions 120 in the first direction, that is, at the right side of the fingerprint identification regions 120 shown in FIG. 4. And the width of the second gap 202 in the first direction is less than one half of the width of the fingerprint identification 120 in the first direction Therefore, the fingerprint identification module can realize ultrasonic focusing and fingerprint identification in a focusing unit with a large area via the plurality of driving chips.

Figure 5:
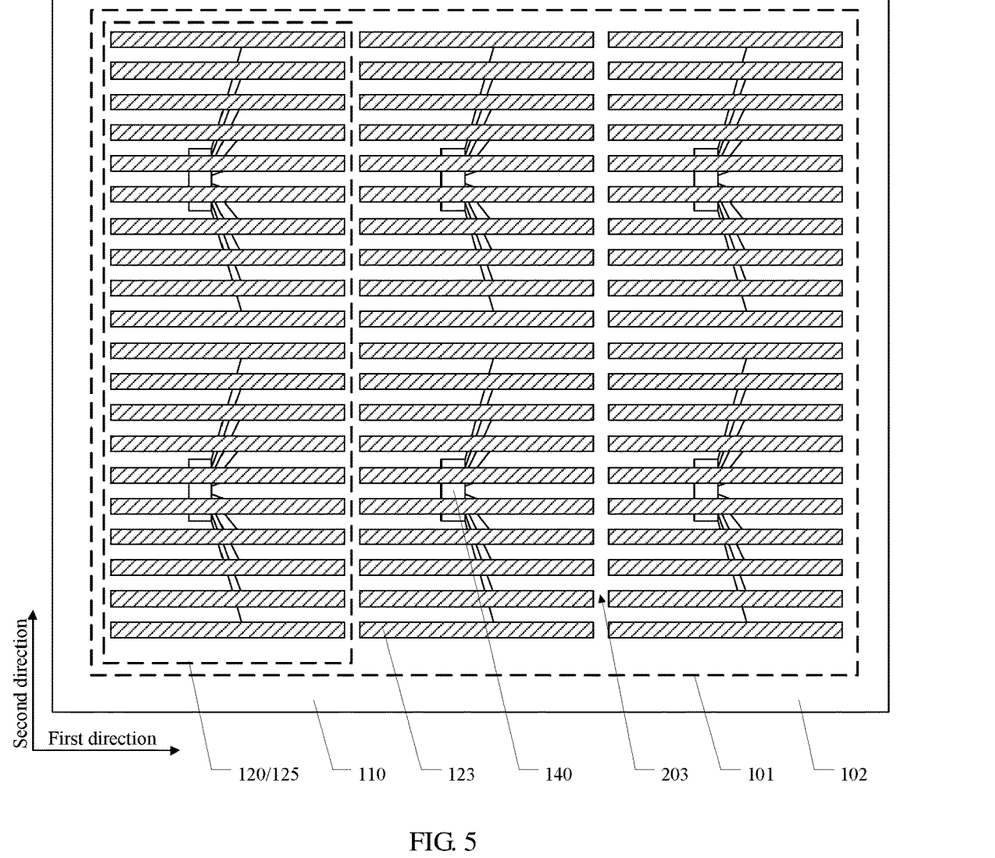
FIG. 5 is a schematic plan view of another fingerprint identification module according to an embodiment of the present disclosure.

FIG. 5 is a schematic plan view of another fingerprint identification module according to an embodiment of the present disclosure. As shown in FIG. 5, the plurality of fingerprint identification regions 120 are arranged at intervals along the first direction and have a third gap 203, the width of the third gap 203 is less than twice the width of the strip-shaped driving electrodes 123 in the second direction, the orthographic projection of the at least one driving chip 140 on the base substrate 110 is at least partially overlapped with the orthographic projection of the plurality of ultrasonic sensors 130 on the base substrate 110, and the at least one driving chip 140 is located at a side of the plurality of ultrasonic sensors 130 away from the base substrate 110. That is to say, the driving chip 140 is located at the side of the ultrasonic sensor 130 away from the substrate 110. In this case, the driving chip 140 can be connected with the strip-shaped driving electrode 123 through a via hole, so that the driving chip 140 and the interconnection line do not occupy the area of the touch region, and the plurality of fingerprint identification regions 120 can be arranged more closely, thereby greatly reducing the touch blind region.

Figure 6:
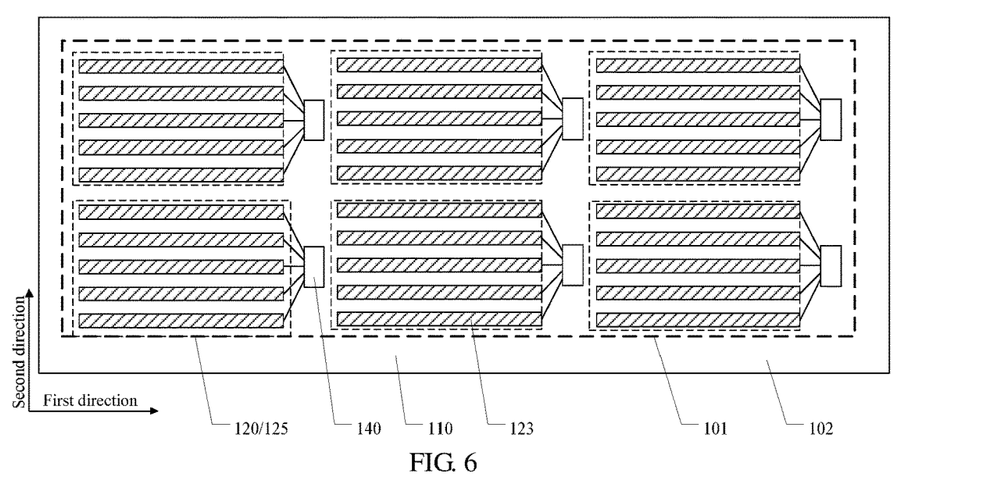
FIG. 6 is a schematic plan view of another fingerprint identification module according to an embodiment of the present disclosure.

FIG. 6 is a schematic plan view of another fingerprint identification module according to an embodiment of the present disclosure. As shown in FIG. 6, each fingerprint identification region 120 is correspondingly provided with one driving chip 140, each fingerprint identification region 120 includes a focusing unit 125, the focusing unit 125 includes K strip-shaped driving electrodes 123 arranged in sequence along the second direction, the K strip-shaped driving electrodes 123 are respectively connected with K output terminals of the driving chip 140, and the driving chip 140 is arranged at a side of the corresponding fingerprint identification region 120 in the first direction, where K is a positive integer greater than or equal to 2. Therefore, the fingerprint identification module 100 can drive one focusing unit 125 via one driving chip 140, so the fingerprint identification module has a simple structure and is easy to be manufactured and repaired.

In some examples, as shown in FIG. 6, the plurality of fingerprint identification regions 120 are arranged in an array along the first direction and the second direction.

Figure 7:
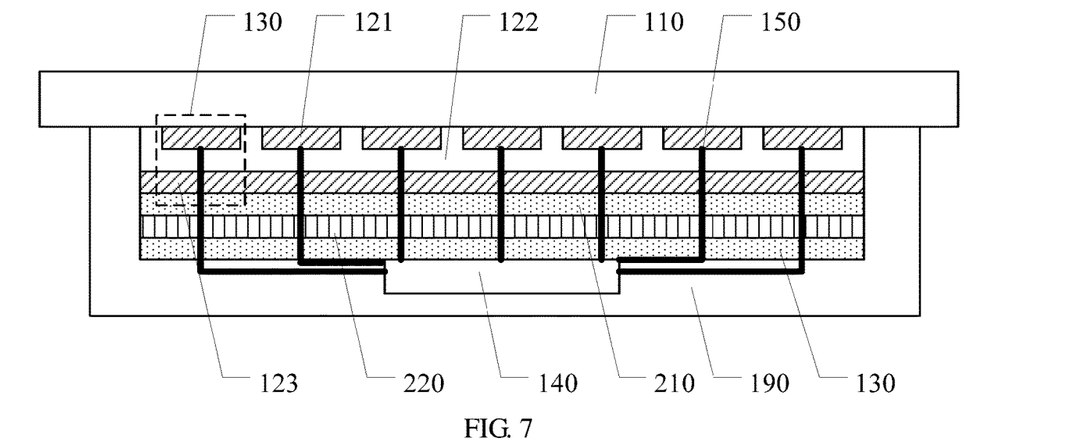
FIG. 7 is a schematic cross-sectional view of another fingerprint identification module according to an embodiment of the present disclosure.

FIG. 7 is a schematic cross-sectional view of another fingerprint identification module according to an embodiment of the present disclosure. As shown in FIG. 7, the orthographic projection of the at least one driving chip 140 on the base substrate 110 is at least partially overlapped with the orthographic projection of the plurality of ultrasonic sensors 130 on the base substrate 110, and the at least one driving chip 140 is located at a side of the plurality of ultrasonic sensors 130 away from the base substrate 110. Therefore, the driving chip 140 does not occupy the area of the touch region 101, thereby greatly reducing the touch blind region.

In some examples, as shown in FIG. 7, the fingerprint identification module 100 further includes a first insulating layer 210, a reflective layer 220 and a second insulating layer 230. The first insulating layer 210 is located at a side of the plurality of driving electrodes 123 away from the base substrate 110, the reflective layer 220 is located at a side of the first insulating layer 220 away from the plurality of driving electrodes 123, the second insulating layer 230 is located at a side of the reflective layer 220 away from the first insulating layer 210, and the at least one driving chip 140 is located at a side of the second insulating layer 230 away from the reflective layer 220. The reflective layer 220 can reflect the ultrasonic wave, which is generated by the piezoelectric material layer 122 and propagates toward the reflective layer 220, toward the base substrate 110, thus being beneficial to enhancing the intensity or energy of the emitted ultrasonic wave.

For example, the material of the second insulating layer 230 can be at least one of doped $SiO_2$, polyimide and parylene.

For example, as shown in FIG. 7, via holes can be formed in the first insulating layer 210, the reflective layer 220 and the second insulating layer 230, so that the interconnection lines 150 can connect the driving chip 140 with the driving electrodes 123 through these via holes, and this design will not occupy the touch region of the fingerprint identification module, thus greatly reducing the detection blind region.

For example, the reflective layer 220 can be made of silver (Ag), and the first insulating layer 210 and the second insulating layer 230 can be made of silicon nitride (SiNx). Of course, the embodiments of the present disclosure include but are not limited to these cases. The reflective layer 220 can also be made of other materials with ultrasonic reflection characteristics, and the first insulating layer 210 and the second insulating layer 230 can be made of other insulating materials such as resin, etc.

Figure 8:
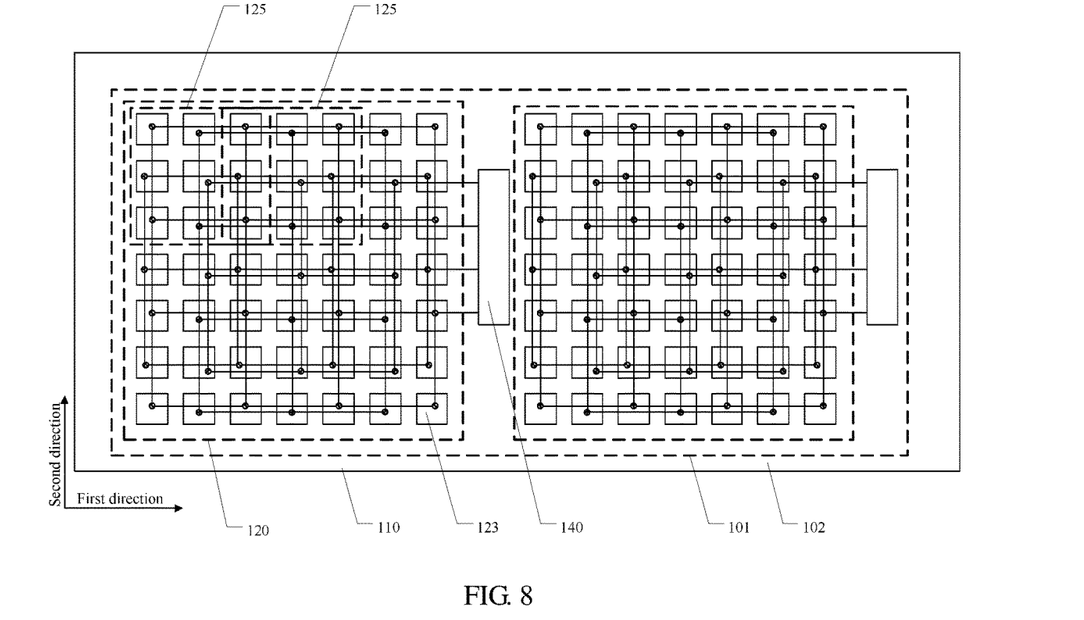
FIG. 8 is a schematic plan view of another fingerprint identification module according to an embodiment of the present disclosure.

FIG. 8 is a schematic plan view of another fingerprint identification module according to an embodiment of the present disclosure. As shown in FIG. 8, the plurality of receiving electrodes 121 are arranged in an array along the first direction and the second direction, each driving electrode 123 is a block-shaped driving electrode 123 arrayed along the first direction and the second direction, and the plurality of receiving electrodes 121 are arranged in one-to-one correspondence with the plurality of block-shaped driving electrodes 123. Therefore, both the plurality of receiving electrodes 121 and the plurality of block-shaped driving electrodes 123 are arranged in an array along the first direction and the second direction, so that focusing can be performed in two dimensions of the first direction and the second direction by driving the plurality of block-shaped driving electrodes 123 respectively.

For example, as shown in FIG. 8, taking the 3*3 matrix at the upper left corner of FIG. 8 as an example, a driving voltage is applied to the central block-shaped driving electrode 123 at the center of the 3*3 matrix at a first time point to drive the piezoelectric material layer corresponding to the central block-shaped driving electrode 123 to emit an ultrasonic wave; then, driving voltages are applied to the four block-shaped driving electrodes 123 adjacent to the central block-shaped driving electrode 123 in the first and second directions at a second time point to drive the piezoelectric material layer corresponding to the four block-shaped driving electrodes 123 adjacent to the central block-shaped driving electrode 123 in the first and second directions to emit ultrasonic waves with a phase delayed compared with the phase of the ultrasonic wave emitted by the piezoelectric material layer corresponding to the central block-shaped driving electrode 1231; finally, driving voltages are applied to the four block-shaped driving electrodes 123 located at the diagonal extension lines of the central block-shaped driving electrode 123 to drive the four block-shaped driving electrodes 123 located at the diagonal extension lines of the central block-shaped driving electrode 123 to emit ultrasonic waves with a phase delayed compared with the phase of the ultrasonic waves emitted by the four block-shaped driving electrodes 123 adjacent to the central block-shaped driving electrode 123 in the first and second directions; therefore, focusing (additive interference) of the ultrasonic waves can be realized directly above the central block-shaped driving electrode 123, so that the intensity or energy of the ultrasonic waves directly above the central block-shaped driving electrode 123 can be enhanced. That is to say, the two-dimensional focusing of ultrasonic waves can be realized by driving the central block-shaped driving electrode in the 3*3 matrix at the first time point, driving the block-shaped driving electrodes with a first distance from the central block-shaped driving electrode in the 3*3 matrix at the second time point and driving the block-shaped driving electrodes with a second distance from the central block-shaped driving electrode in the 3*3 matrix at the third time point. It should be noted that the third time point is delayed after the second time point, and the second time point is delayed after the first time point, and the second distance is greater than the first distance.

In some examples, as shown in FIG. 8, each fingerprint identification region 120 is correspondingly provided with one driving chip 140, each fingerprint identification region 120 includes at least one focusing unit 125, each focusing unit 125 includes D*D block-shaped driving electrodes 123 arranged in a D*D matrix along the first direction and the second direction, and the D*D block-shaped driving electrodes 123 are connected with the driving chip 140, where D is a positive integer greater than or equal to 2.

In some examples, as shown in FIG. 8, each fingerprint identification region 120 includes a plurality of focusing units 125, and the block-shaped driving electrodes 123 with the same coordinates in the plurality of focusing units 125 are electrically connected with one another and connected with one output terminal 142 of the driving chip 140. Therefore, the fingerprint identification module can drive the plurality of focusing units via one driving chip 140. It should be noted that the coordinates mentioned above refer to the coordinates of a block-shaped driving electrode in the D*D matrix mentioned above. For example, the block-shaped driving electrodes with the same coordinates in the plurality of focusing units refer to that the relative positions of the block-shaped driving electrodes in the corresponding focusing units are the same, and for example, the block-shaped driving electrodes with the same coordinates have the same row number and the same column number in the matrix of the corresponding focusing units.

In some examples, as shown in FIG. 8, in each fingerprint identification region 120, two focusing units 125 adjacent in the first direction can share a group of block-shaped driving electrodes 123 arranged in the second direction, and two focusing units 125 adjacent in the second direction can share a group of block-shaped driving electrodes 123 arranged in the first direction, thus facilitating scan driving.

In some examples, the material of the driving electrode 123 includes one or more selected from the group consisting of copper, silver and aluminum.

Figure 9:
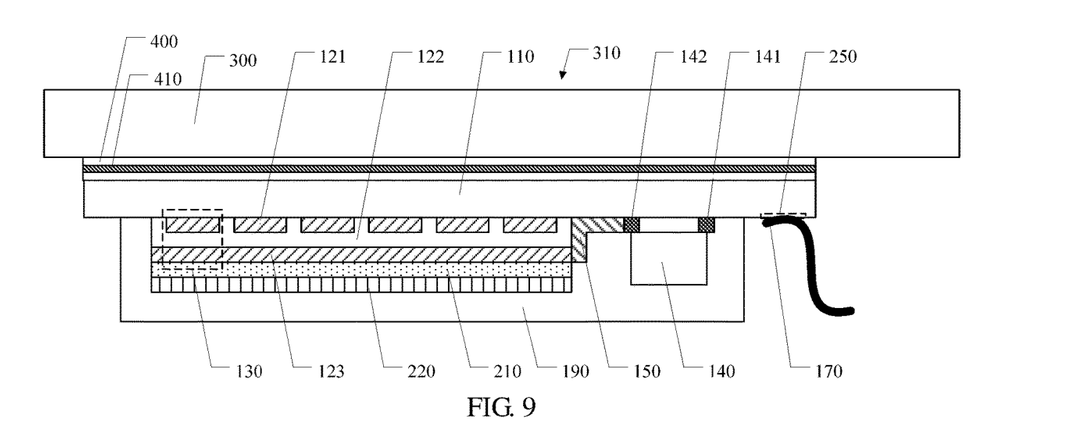
FIG. 9 is a schematic structural diagram of a display apparatus according to an embodiment of the present disclosure.

FIG. 9 is a schematic structural diagram of a display apparatus according to an embodiment of the present disclosure. As shown in FIG. 9, the display apparatus 500 includes the fingerprint identification module 100 described above. Therefore, the display apparatus is provided with a plurality of fingerprint identification regions, and each fingerprint identification region is provided with at least one driving chip, so that a single driving chip only needs to drive a fingerprint identification region with a small area, thereby realizing large-area fingerprint detection. In addition, a single driving chip only needs to drive a fingerprint identification region with a small area, so the driving chip can adopt a mono-crystal semiconductor-based chip such as a silicon-based chip or a gallium arsenide-based chip, etc., to provide a high-performance driving voltage, and a single driving chip can also independently control the driving voltages of each ultrasonic sensor (for example, provide driving voltages with different phases), thereby realizing functions such as ultrasonic focusing, etc. Therefore, on the one hand, the fingerprint identification module can improve the intensity and penetration capability of ultrasonic waves emitted by the ultrasonic sensor, and on the other hand, the fingerprint identification module can realize ultrasonic focusing to improve the directionality of ultrasonic waves and reduce the crosstalk between ultrasonic waves reflected by adjacent valleys and ridges on the finger, thus significantly improving the fingerprint image quality and further improving the fingerprint identification performance. In addition, on the other hand, when the fingerprint identification module improves the intensity or energy of the emitted ultrasonic waves in a specific region or direction by focusing the ultrasonic waves, the fingerprint identification module can not only realize fingerprint identification, but also penetrate the finger to distinguish whether the fingerprint is real skin. For more details, please refer to the relevant description of the above embodiments of the fingerprint identification module, which will not be repeated here.

In some examples, as shown in FIG. 9, the display apparatus 500 further includes a display panel 300 and an adhesive layer 400; the display panel 300 has a light emitting side 310, i.e., a display side; the fingerprint identification module 100 is attached to one side of the display panel 300 away from the light emitting side 310 through the adhesive layer 400, and the adhesive layer 400 includes a light shielding layer 410, so that the influence of illumination of the display panel 300 on the driving circuit 140 and the ultrasonic sensors 130 can be shielded, and the electromagnetic interference between the display panel and the fingerprint identification module can be electrically isolated.

For example, the thickness of the adhesive layer 400 in the direction perpendicular to the display panel 300 is less than one tenth of the wavelength of the ultrasonic wave emitted by the ultrasonic sensor 130, so that the influence on the ultrasonic wave can be reduced.

Figure 10:
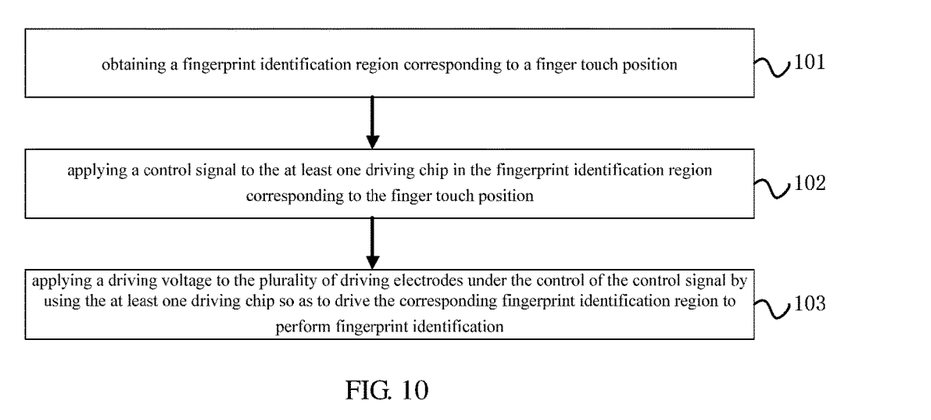
FIG. 10 is a flowchart of a driving method of a fingerprint identification module according to an embodiment of the present disclosure.

FIG. 10 is a flowchart of a driving method of a fingerprint identification module according to an embodiment of the present disclosure. The fingerprint identification module can be the fingerprint identification module described above. As shown in FIG. 10, the driving method of the fingerprint identification module includes the following steps S101-S103.

Step S101: obtaining a fingerprint identification region corresponding to a finger touch position.

For example, the touch region of the fingerprint identification module can be divided into a plurality of fingerprint identification regions, and when finger touch occurs, the fingerprint identification region corresponding to the finger touch position is firstly acquired.

Step S102: applying a control signal to the at least one driving chip in the fingerprint identification region corresponding to the finger touch position.

Step S103: applying a driving voltage to the plurality of driving electrodes under the control of the control signal by using the at least one driving chip so as to drive the corresponding fingerprint identification region to perform fingerprint identification.

In some examples, in the driving method of the fingerprint identification module, applying the driving voltage to the plurality of driving electrodes under the control of the control signal by using the at least one driving chip to drive the corresponding fingerprint identification region to perform fingerprint identification includes: the at least one driving chip applying driving voltages with different phases to the plurality of driving electrodes under the control of the control signal so as to focus in the fingerprint identification region.

Figure 11:
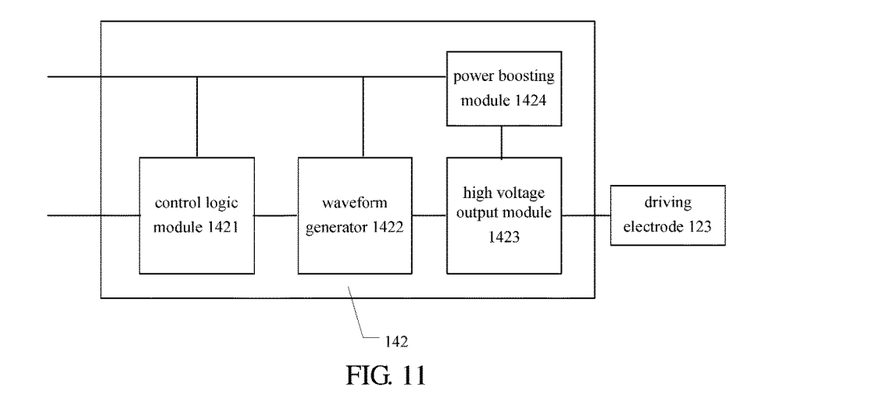
FIG. 11 is a schematic diagram of a driving circuit in a driving chip according to an embodiment of the present disclosure.

FIG. 11 is a schematic diagram of a driving circuit in a driving chip according to an embodiment of the present disclosure. As shown in FIG. 11, the driving circuit 142 includes a control logic module 1421, a waveform generator 1422, a high voltage output module 1423 and a power boosting module 1424. The control logic module 1421 can be communicatively connected with the external integrated circuit for receiving a control signal; the control logic module 1421 is also communicatively connected with the waveform generator 1422 and controls the waveform generator 1422 to generate a low-voltage square wave signal corresponding to the control signal; the high-voltage output module 1423 is connected with the power boosting module 1424 and the waveform generator 1422, and the high-voltage output module 1423 and the power boosting module 1424 are configured to boost the low-voltage square wave signal generated by the waveform generator 1422 so as to output a high-voltage square wave signal. For example, as shown in FIG. 11, the high voltage output module 1423 can output the high-voltage square wave signal to the driving electrode 123.

Figure 12:
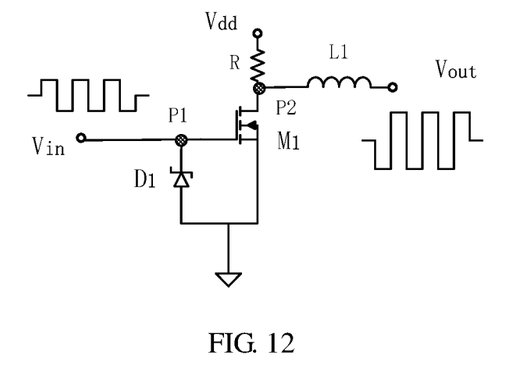
FIG. 12 is a schematic diagram of a high voltage output module in a driving circuit according to an embodiment of the present disclosure.

FIG. 12 is a schematic diagram of a high voltage output module in a driving circuit according to an embodiment of the present disclosure. As shown in FIG. 12, the high voltage output module 1423 includes an input terminal Vin, a high voltage input terminal Vdd, a first N-type transistor M1, a resistor R, a Zener diode D1, a first inductor L1 and an output terminal Vout. The input terminal Vin, the negative electrode of the Zener diode D1 and the gate electrode of the first N-type transistor M1 are connected with a first node P1; the source electrode of the first N-type transistor M1, one end of the resistor R and one end of the first inductor L1 are connected with a second node P2; the drain electrode of the first N-type transistor M1 and the positive electrode of the Zener diode d are grounded; and the output terminal Vout is connected with the other end of the first inductor L1. The input terminal Vin is configured to input the low-voltage square wave signal described above, the high level of the low-voltage square wave signal can turn on the first N-type transistor M1, and the output terminal Vout outputs a low level; the low level of the low-voltage square wave signal can turn off the first N-type transistor M1, and the output terminal Vout can output the high level of the high voltage input terminal Vdd, so that a high-voltage square wave signal can be generated. It should be noted that the above Zener diode D1 can prevent the input voltage from being too high.

Figure 13:
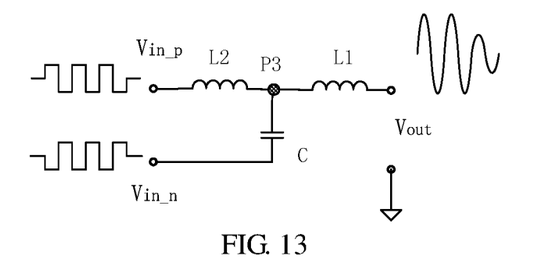
FIG. 13 is a schematic diagram of a high voltage output module in another driving circuit according to an embodiment of the present disclosure.

FIG. 13 is a schematic diagram of a high voltage output module in another driving circuit according to an embodiment of the present disclosure. As shown in FIG. 13, the high voltage output module 1423 includes a first input terminal Vin_p, a second input terminal Vin_n, a first inductor L1, a second inductor L2 and a capacitor C. One end of the second inductor L2 is connected with the first input terminal Vin_p, the other end of the second inductor L2 is connected with a third node P3, the first electrode of the capacitor C is connected with the second input terminal Vin_n, the second electrode of the capacitor C is connected with the third node P3, one end of the first inductor L1 is connected with the third node P3, and the other end of the first inductor L1 is connected with the output terminal Vout. The second inductor L2 and the capacitor C can form a frequency selection network, so as to convert two reverse low-voltage square wave signals input by the first input terminal Vin_p and the second input terminal Vin_n into a high-voltage sine wave.

Figure 14:
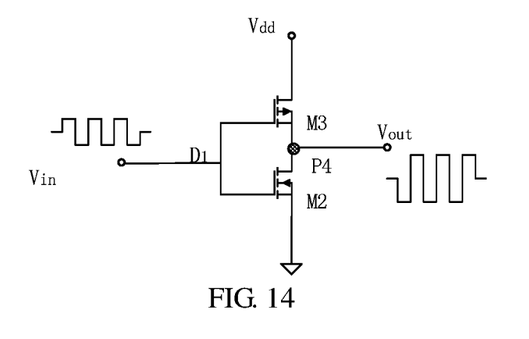
FIG. 14 is a schematic diagram of a high voltage output module in another driving circuit according to an embodiment of the present disclosure.

FIG. 14 is a schematic diagram of a high voltage output module in another driving circuit according to an embodiment of the present disclosure. As shown in FIG. 14, the high voltage output module 1423 includes an input terminal Vin, a high voltage input terminal Vdd, an output terminal Vout, a P-type transistor M3 and a second N-type transistor M2; the input terminal Vin is connected with the gate electrode of the P-type transistor M3 and the gate electrode of the second N-type transistor M2, the source electrode of the P-type transistor M3 is connected with the high voltage input terminal Vdd, the drain electrode of the P-type transistor M3, the source electrode of the second N-type transistor M2 and the output terminal Vout are connected with the fourth node P4, and the drain electrode of the second N-type transistor M2 is grounded. Therefore, the P-type transistor M3 and the second N-type transistor M2 can form an inverter structure. The high level of the low-voltage square wave signal can turn on the second N-type transistor M2 and turn off the P-type transistor M3, and the output terminal outputs a low level; the low level of the low-voltage square wave signal can turn off the second N-type transistor M2 and turn on the P-type transistor M3, and the output terminal Vout can output the high level of the high voltage input terminal Vdd, so that a high-voltage square wave signal can be generated.

The following statements should be noted:

(1) The accompanying drawings involve only the structure(s) in connection with the embodiment(s) of the present disclosure, and other structure(s) can be referred to common design(s).

(2) In case of no conflict, features in one embodiment or in different embodiments can be combined.

What have been described above are only specific implementations of the present disclosure, the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A fingerprint identification module, comprising a base substrate and a plurality of fingerprint identification regions located on the base substrate, wherein each of the plurality of fingerprint identification regions comprises:
   a plurality of receiving electrodes;
   a piezoelectric material layer, located at a side of the plurality of receiving electrodes; and
   a plurality of driving electrodes, located at a side of the piezoelectric material layer away from the plurality of receiving electrodes;
   wherein the plurality of receiving electrodes, the piezoelectric material layer and the plurality of driving electrodes form a plurality of ultrasonic sensors, each of the plurality of fingerprint identification regions is correspondingly provided with at least one driving chip, the plurality of driving electrodes in each of the plurality of fingerprint identification regions are connected with an output terminal of the at least one driving chip, and the at least one driving chip is configured to apply a driving voltage to the plurality of driving electrodes so as to drive the plurality of ultrasonic sensors in the corresponding fingerprint identification region to perform fingerprint identification.

2. The fingerprint identification module according to claim 1, further comprising:
interconnection lines, connecting the plurality of driving electrodes in each of the plurality of fingerprint identification regions with a plurality of output terminals of the at least one driving chip.

3. The fingerprint identification module according to claim 1, further comprising:
a flexible circuit board; and
an external integrated circuit,
wherein a control terminal of the at least one driving chip corresponding to each of the plurality of fingerprint identification regions is connected with the external integrated circuit through the flexible circuit board.

4. The fingerprint identification module according to claim 1, further comprising:
an encapsulation layer, located at a side of the plurality of ultrasonic sensors and the at least one driving chip away from the base substrate, and covering the plurality of ultrasonic sensors and the at least one driving chip to encapsulate the plurality of ultrasonic sensors and the at least one driving chip on the base substrate,
wherein the at least one driving chip comprises a mono-crystal semiconductor substrate and a driving circuit, and a part of the driving circuit is located in the mono-crystal semiconductor substrate.

5. The fingerprint identification module according to claim 1, wherein the plurality of receiving electrodes are arranged in an array along a first direction and a second direction, each of the plurality of driving electrodes is a strip-shaped driving electrode extending along the first direction, and a plurality of the strip-shaped driving electrodes are arranged at intervals along the second direction.

6. The fingerprint identification module according to claim 5, wherein each of the plurality of fingerprint identification regions is correspondingly provided with one driving chip, each of the plurality of fingerprint identification regions comprises a plurality of focusing units, each of the plurality of focusing units comprises N strip-shaped driving electrodes arranged in sequence along the second direction, and the strip-shaped driving electrodes with a same order in the plurality of focusing units are electrically connected with one another and connected with one output terminal of the driving chip, where N is a positive integer greater than or equal to 2.

7. The fingerprint identification module according to claim 6, wherein the plurality of fingerprint identification regions are arranged at intervals along the first direction and have a first gap between two adjacent ones of the plurality of fingerprint identification regions, an orthographic projection of the driving chip on the base substrate is spaced apart from the plurality of fingerprint identification regions and the first gap, and a width of the first gap in the first direction is less than one third of a width of each of the plurality of fingerprint identification regions in the first direction.

8. The fingerprint identification module according to claim 5, wherein each of the plurality of fingerprint identification regions is correspondingly provided with a plurality of driving chips, each of the plurality of fingerprint identification regions comprises one focusing unit, the focusing unit comprises M strip-shaped driving electrodes arranged in sequence along the second direction, and the M strip-shaped driving electrodes are respectively connected with M output terminals of the plurality of driving chips, where M is a positive integer greater than or equal to 2.

9. The fingerprint identification module according to claim 8, wherein the plurality of fingerprint identification regions are arranged at intervals along the first direction and have a second gap between two adjacent ones of the plurality of fingerprint identification regions, the plurality of driving chips are sequentially arranged along the second direction, and the plurality of driving chips are arranged at a side of a corresponding one of the plurality of fingerprint identification regions in the first direction, and a width of the second gap in the first direction is less than one half of a width of each of the plurality of fingerprint identification regions in the first direction.

10. The fingerprint identification module according to claim 8, wherein the plurality of fingerprint identification regions are arranged at intervals along the first direction and have a third gap between two adjacent ones of the plurality of fingerprint identification regions, a width of the third gap is less than twice a width of the strip-shaped driving electrode, an orthographic projection of the at least one driving chip on the base substrate is at least partially overlapped with an orthographic projection of the plurality of ultrasonic sensors on the base substrate; and the at least one driving chip is located at a side of the plurality of ultrasonic sensors away from the base substrate.

11. The fingerprint identification module according to claim 5, wherein each of the plurality of fingerprint identification regions is correspondingly provided with one driving chip, each of the plurality of fingerprint identification regions comprises one focusing unit, the focusing unit comprises K strip-shaped driving electrodes arranged in sequence along the second direction, and the K strip-shaped driving electrodes are connected with K output terminals of the driving chip, and the driving chip is arranged at a side of the corresponding fingerprint identification region in the first direction, where K is a positive integer greater than or equal to 2.

12. The fingerprint identification module according to claim 1, wherein there is a gap between an orthographic projection of the at least one driving chip on the base substrate and an orthographic projection of the piezoelectric material layer on the base substrate.

13. The fingerprint identification module according to claim 1, wherein an orthographic projection of the at least one driving chip on the base substrate is at least partially overlapped with the orthographic projection of the plurality of ultrasonic sensors on the base substrate, and the at least one driving chip is located at a side of the plurality of ultrasonic sensors away from the base substrate.

14. The fingerprint identification module according to claim 1, wherein the plurality of receiving electrodes are arranged in an array along a first direction and a second direction, and each of the plurality of driving electrodes is a block-shaped driving electrode, and the plurality of receiving electrodes are arranged in one-to-one correspondence with the plurality of block-shaped driving electrodes.

15. The fingerprint identification module according to claim 14, wherein each of the plurality of fingerprint identification regions is correspondingly provided with one driving chip, each of the plurality of fingerprint identification regions comprises at least one focusing unit, each focusing unit comprises D*D block-shaped driving electrodes arranged in a D*D matrix along the first direction and the second direction, and the D*D block-shaped driving electrodes are connected with the driving chip, where D is a positive integer greater than or equal to 2.

16. The fingerprint identification module according to claim 15, wherein each of the plurality of fingerprint identification regions comprises a plurality of focusing units, and the block-shaped driving electrodes with same coordinates in the plurality of focusing units are electrically connected with one another and connected with one output terminal of the driving chip.

17. A display apparatus, comprising the fingerprint identification module according to claim 1.

18. The display apparatus according to claim 17, further comprising:
    a display panel, having a light emitting side; and
    an adhesive layer,
    wherein the fingerprint identification module is attached to one side of the display panel away from the light emitting side through the adhesive layer, and the adhesive layer comprises a light shielding layer.

19. A driving method of a fingerprint identification module, wherein the fingerprint identification module is the fingerprint identification module according to claim 1, and the driving method comprises:
    obtaining a fingerprint identification region corresponding to a finger touch position;
    applying a control signal to the at least one driving chip in the fingerprint identification region corresponding to the finger touch position; and
    applying a driving voltage to the plurality of driving electrodes under control of the control signal by using the at least one driving chip so as to drive the corresponding fingerprint identification region to perform fingerprint identification.

20. The driving method of the fingerprint identification module according to claim 19, wherein applying the driving voltage to the plurality of driving electrodes under the control of the control signal by using the at least one driving chip so as to drive the corresponding fingerprint identification region to perform fingerprint identification comprises:
    applying driving voltages with different phases to the plurality of driving electrodes under the control of the control signal by using the at least one driving chip so as to focus in the fingerprint identification region.

* * * * *